(12) United States Patent
Takahashi et al.

(10) Patent No.: US 8,270,350 B2
(45) Date of Patent: Sep. 18, 2012

(54) RECEIVING APPARATUS, RECEIVING METHOD AND WIRELESS COMMUNICATION SYSTEM

(75) Inventors: Hiroaki Takahashi, Kanagawa (JP); Tomoya Yamaura, Tokyo (JP); Shinichi Kuroda, Tokyo (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/492,746

(22) Filed: Jun. 26, 2009

(65) Prior Publication Data

US 2009/0323591 A1    Dec. 31, 2009

(30) Foreign Application Priority Data

Jun. 30, 2008   (JP) ................................ P2008-171142

(51) Int. Cl.
*H04W 4/00* (2009.01)
(52) U.S. Cl. ....................................... 370/328; 375/340
(58) Field of Classification Search .................. 370/328; 375/340, 148, 285, 224, 259
See application file for complete search history.

(56) References Cited

U.S. PATENT DOCUMENTS

| 6,026,130 | A   | * | 2/2000  | Rahmatullah et al. ......... 375/340 |
| 6,704,369 | B1  | * | 3/2004  | Kawasaki et al. .............. 375/285 |
| 2006/0203894 | A1 | * | 9/2006 | Ventola ......................... 375/148 |
| 2011/0200082 | A1 | * | 8/2011 | Nakao et al. ................... 375/224 |
| 2011/0317775 | A1 | * | 12/2011 | Gardner et al. ................ 375/259 |

FOREIGN PATENT DOCUMENTS

| JP | 10-200503    | 7/1998  |
| JP | 2005-348235  | 12/2005 |
| JP | 2007-208719  | 8/2007  |
| JP | 2007-324729  | 12/2007 |

* cited by examiner

*Primary Examiner* — Albert T Chou
(74) *Attorney, Agent, or Firm* — Finnegan, Henderson, Farabow, Garrett & Dunner, L.L.P.

(57) ABSTRACT

A receiving apparatus is provided which includes a receiving unit to receive a radio signal, a transfer function estimation unit to estimate a transfer function of a communication path of the radio signal, and a cross-correlation calculation unit to calculate cross-correlation between a synchronous signal contained in a radio signal received by the receiving unit and a known synchronous signal multiplied by the transfer function estimated by the transfer function estimation unit.

12 Claims, 8 Drawing Sheets

RECEIVING APPARATUS, RECEIVING METHOD AND WIRELESS COMMUNICATION SYSTEM

BACKGROUND OF THE INVENTION

1. Field of the Invention

The present invention relates to a receiving apparatus, a receiving method and a wireless communication system.

2. Description of the Related Art

Wireless communication apparatus based on the IEEE (Institute of Electrical and Electronic Engineers) 802.11 standard are widespread today. The flow of wireless communication between wireless communication apparatus is briefly described below.

(1) RF (Radio Frequency) transmission processing in a wireless communication apparatus at the transmitting end (2) Transmission of a high-frequency signal obtained by the RF transmission processing as a radio signal through a wireless transmission line (3) Reception of the radio signal and RF reception processing in a wireless communication apparatus at the receiving end (4) Cross-correlation calculation between a received signal obtained by the RF reception processing and a known signal pattern (5) Demodulation and decoding of the received signal based on the timing of detection of cross-correlation The cross-correlation calculation in the above (4) is described in detail. The wireless communication apparatus at the transmitting end transmits a radio signal containing L-LTF, which is a known signal pattern. Then, the wireless communication apparatus at the receiving end calculates cross-correlation between L-LTF that is contained in the received signal obtained by the RF reception processing and the L-LTF that is a known signal pattern, thereby detecting synchronous timing. The cross-correlation calculation is disclosed in Japanese Unexamined Patent Publication No. 2007-324729, for example.

SUMMARY OF THE INVENTION

However, the L-LTF that is contained in the received signal obtained by the RF reception processing is different from the L-LTF that is stored as a known signal pattern in the wireless communication apparatus at the receiving end. This is caused by that a transfer function is mixed into the L-LTF in the process of the RF transmission processing in the wireless communication apparatus at the transmitting end, the wireless transmission line, the RF reception processing in the wireless communication apparatus at the receiving end and so on. As a result, there is a concern that the calculation accuracy of cross-correlation in the cross-correlation calculation in the above (4) is degraded.

In light of the above concern, it is desirable to provide a novel and improved receiving apparatus, receiving method and wireless communication system that are capable of improving the calculation accuracy of cross-correlation.

According to an embodiment of the present invention, there is provided a receiving apparatus including a receiving unit to receive a radio signal, a transfer function estimation unit to estimate a transfer function of a communication path of the radio signal, and a cross-correlation calculation unit to calculate cross-correlation between a synchronous signal contained in a radio signal received by the receiving unit and a known synchronous signal multiplied by the transfer function estimated by the transfer function estimation unit.

The receiving apparatus may further include a storage unit to store the known synchronous signal, and a correction unit to multiply the known synchronous signal stored in the storage unit by the transfer function estimated by the transfer function estimation unit.

The storage unit may store the transfer function estimated by the transfer function estimation unit in association with a transmission source apparatus of the radio signal, and the correction unit may extract a transfer function of a transmission source apparatus of a radio signal received by the receiving unit from the storage unit and multiply the known synchronous signal by the transfer function.

The receiving apparatus may further include a correction unit to multiply the known synchronous signal by the transfer function estimated by the transfer function estimation unit, and a storage unit to store the known synchronous signal multiplied by the transfer function by the correction unit.

The transfer function estimation unit may estimate the transfer function based on a first radio signal containing information indicating that a radio signal is continuously transmitted subsequently, and the cross-correlation calculation unit may calculate cross-correlation between a synchronous signal contained in a second radio signal transmitted continuously subsequent to the first radio signal and the known synchronous signal multiplied by the transfer function estimated based on the first radio signal by the transfer function estimation unit.

The transfer function of the communication path may include at least any one of a transfer function of a wireless transmission line of the radio signal, a transfer function of the receiving unit and a transfer function of a transmission source apparatus of the radio signal.

According to another embodiment of the present invention, there is provided a receiving method including the steps of receiving a first radio signal, estimating a transfer function of a communication path of the first radio signal, receiving a second radio signal, and calculating cross-correlation between a synchronous signal contained in the received second radio signal and a known synchronous signal multiplied by the estimated transfer function.

According to another embodiment of the present invention, there is provided a wireless communication system including a transmitting apparatus to transmit a radio signal, and a receiving apparatus including a receiving unit to receive a radio signal transmitted from the transmitting apparatus, a transfer function estimation unit to estimate a transfer function of a communication path of the radio signal, and a cross-correlation calculation unit to calculate cross-correlation between a synchronous signal contained in a radio signal received by the receiving unit and a known synchronous signal multiplied by the transfer function estimated by the transfer function estimation unit.

According to the embodiments of the present invention described above, it is possible to improve the accuracy of cross-correlation calculation.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order:

(1) Wireless communication system related to the embodiment
(2) First embodiment of the present invention
  (2-1) Structure of the wireless communication apparatus according to the first embodiment of the present invention
  (2-2) Operation of the wireless communication apparatus according to the first embodiment of the present invention
(3) Second embodiment of the present invention
(4) Summary

(1) Wireless Communication System Related to the Embodiment

Before describing an embodiment of the present invention, a wireless communication system 11 related to the embodiment is described hereinafter.

Figure 1:
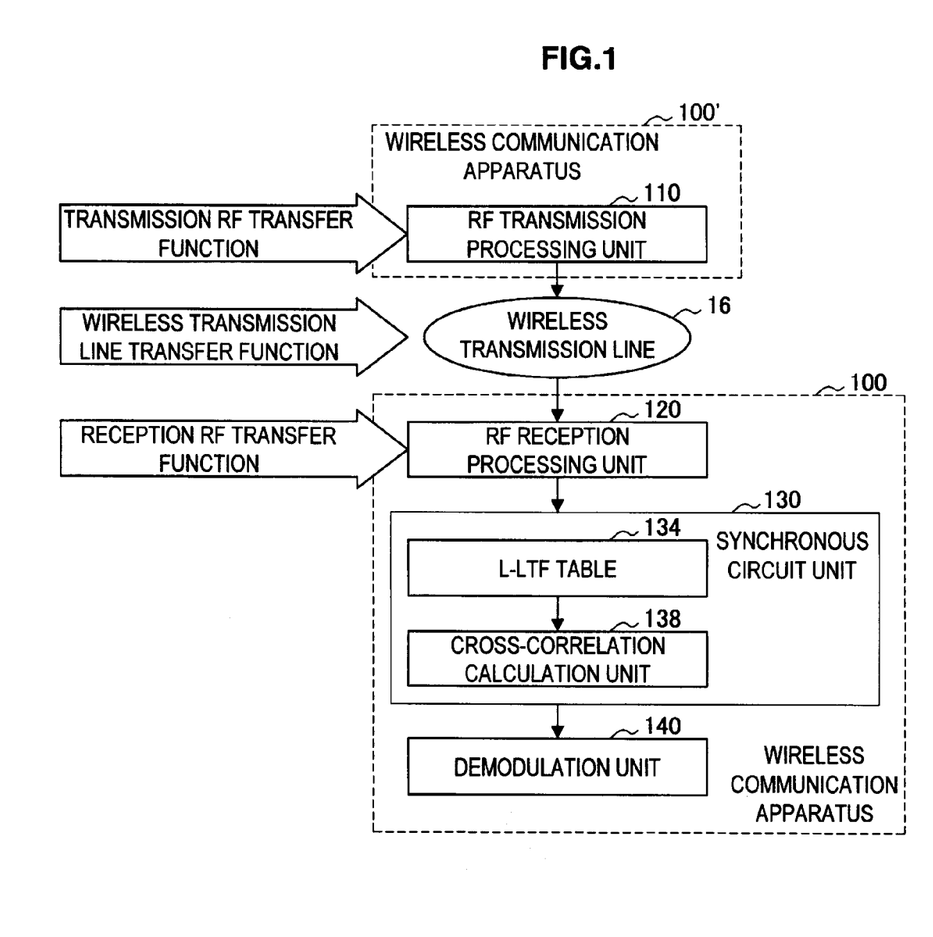
FIG. 1 is an explanatory view showing the structure of a wireless communication system related to an embodiment of the present invention.

FIG. 1 is an explanatory view showing the structure of a wireless communication system 11 related to an embodiment of the present invention. Referring to FIG. 1, the wireless communication system 11 includes a plurality of wireless communication apparatus 100 and 100' and a wireless transmission line 16. FIG. 1 shows an example where the wireless communication apparatus 100' serves as the transmitting end and the wireless communication apparatus serves as the receiving end.

As shown in FIG. 1, the wireless communication apparatus 100' includes an RF transmission processing unit 110 that performs RF transmission processing on a baseband transmission signal to convert it into a high-frequency signal. The transmission signal after the RF transmission processing is performed by the RF transmission processing unit 110 is transmitted as a radio signal through the wireless transmission line 16. A preamble shown in FIG. 2 is added at the head of the radio signal that is transmitted from the wireless communication apparatus 100'.

Figure 2:
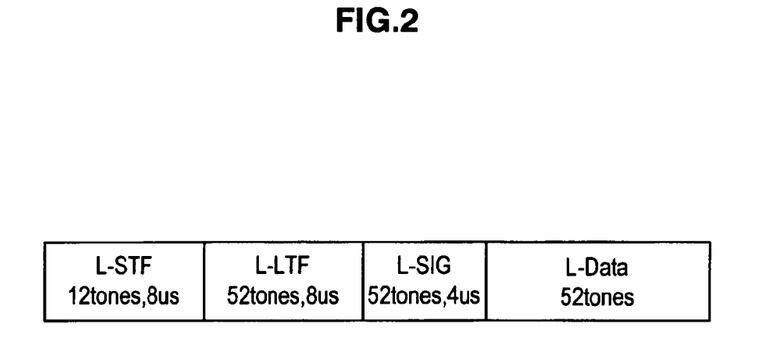
FIG. 2 is an explanatory view showing an example of the structure of a preamble.

FIG. 2 is an explanatory view showing an example of the structure of a preamble. As shown in FIG. 2, the preamble contains L-STF (Short Training Field), L-LTF (Long Training Field) and L-SIG, and further data (L-Data) is added after that. In this description, one unit containing the preamble and data is referred to in some cases as a packet.

In the L-STF (first synchronous signal), a known signal pattern with a period of 0.8 μs is repeated ten times, and the receiving end detects reception of a radio signal based on the L-STF. In the L-LTF (second synchronous signal), after the latter half (1.6 μs) of a known signal pattern with a period of 3.2 μs, the signal pattern is repeated twice (8 μs in total). Thus, the latter half of the signal pattern added at the head of the L-LTF serves as a guard interval.

The L-SIG contains information such as a transmission rate and a modulation scheme of the data contained in the frame. The preamble may be prestored as a signal in the time domain in the wireless communication apparatus 100', and the wireless communication apparatus 100' may add the stored preamble to the head of a transmission signal.

Returning to the description of the wireless communication system 11 related to the embodiment by referring back to FIG. 1, the wireless communication apparatus 100 includes an RF reception processing unit 120, a synchronous circuit unit 130 that includes an L-LTF table 134 and a cross-correlation calculation unit 138, and a demodulation unit 140.

The RF reception processing unit 120 performs RF reception processing on a radio signal that has reached the wireless communication apparatus 100 through the wireless transmission line 16 and converts it into a baseband received signal. The L-LTF table 134 stores the signal pattern of the L-LTF shown in FIG. 2, and the cross-correlation calculation unit 138 calculates cross-correlation between the L-LTF contained in the received signal and the L-LTF stored in the L-LTF table 134. Calculation of the cross-correlation is briefly described hereinafter with reference to FIG. 3.

Figure 3:
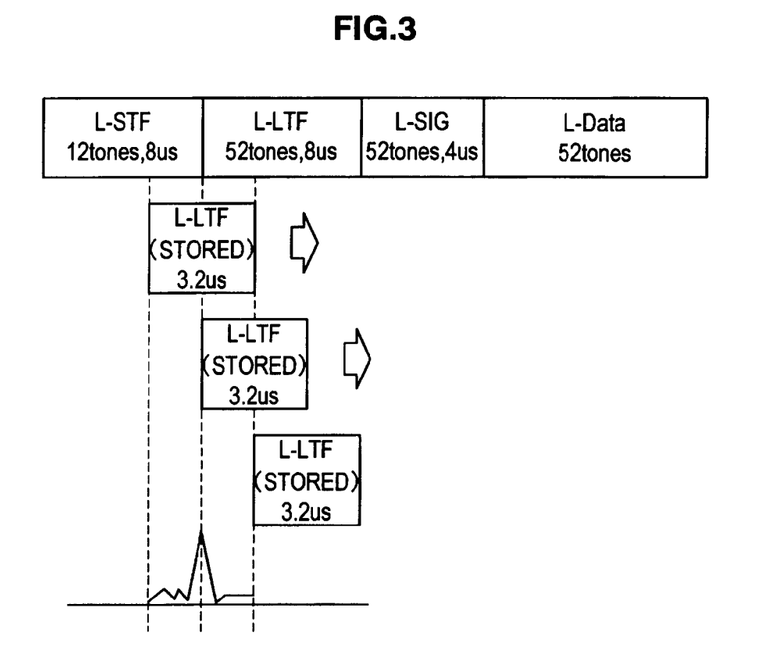
FIG. 3 is an explanatory view conceptually showing cross-correlation calculation.

FIG. 3 is an explanatory view conceptually showing cross-correlation calculation. As described above, the cross-correlation calculation unit 138 calculates cross-correlation between the L-LTF of 3.2 μs that is stored in the L-LTF table 134 and a part of the received signal that is estimated as L-LTF. Because the head of the L-LTF contained in the received signal is considered to be a peak value of cross-correlation as shown in FIG. 3, the cross-correlation calculation unit 138 can detect the head of the L-LTF by the peak value of cross-correlation. Although it is assumed that a plurality of peak values appear since the same signal pattern is repeated in the L-LTF, the case where the cross-correlation calculation unit 138 detects only the head of the L-LTF as shown in FIG. 3 is described by way of illustration.

If the head of the L-LTF is detected by the cross-correlation calculation unit 138, demodulation and decoding of the received signal is performed by the demodulation unit 140 or the like based on the detection timing (synchronous timing) of the head of the L-LTF. Thus, the accuracy of detecting the head of the L-LTF by the cross-correlation calculation unit 138 is important for accurate demodulation and decoding of the received signal. However, in the wireless communication system 11 related to the embodiment, the head of the L-LTF is not accurately detected in some cases. The reason for this is described hereinbelow.

As shown in FIG. 1, the transmission signal is multiplied by a transfer function of the RF transmission processing unit 110 (transmission RF transfer function), multiplied by a transfer function of the wireless transmission line and further multiplied by a transfer function of the RF reception processing unit 120 (reception RF transfer function), and then input to the synchronous circuit unit 130. Thus, the received signal Y that is input to the synchronous circuit unit 130 is represented as the following expression 1 where the transmission signal is X, the transmission RF transfer function is αtx, the transfer function of the wireless transmission line is αp, and the reception RF transfer function is αrx:

$$Y = \alpha_{rx} \times \alpha_p \times \alpha_{tx} \times X \quad \text{[Expression 1]}$$

Figure 4:
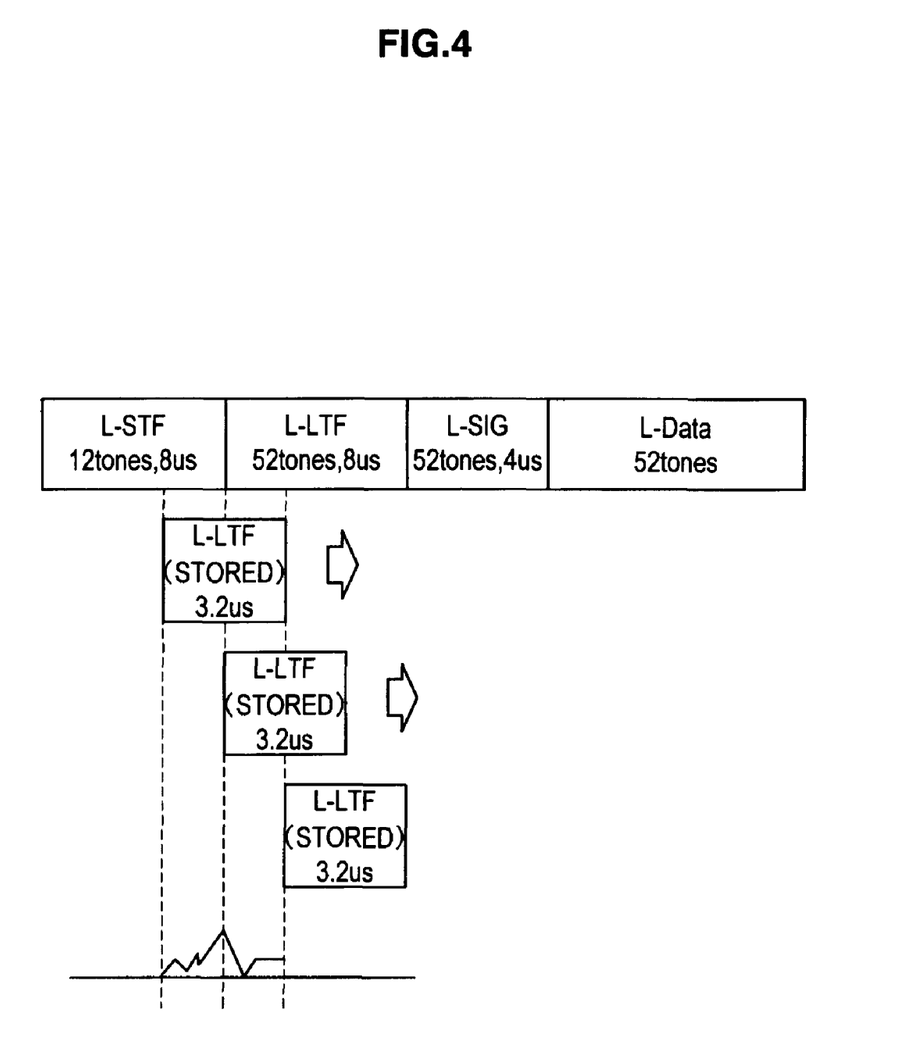
FIG. 4 is an explanatory view showing a failure example of cross-correlation calculation.

Accordingly, there may be a case where the L-LTF contained in the received signal and the L-LTF stored in the L-LTF table 134 do not match, and therefore the cross-correlation calculation unit 138 fails to accurately detect the head of the L-LTF as shown in FIG. 4.

FIG. 4 is an explanatory view showing a failure example of cross-correlation calculation. As shown in FIG. 4, the case where the peak value does not appear at the head of the L-LTF is assumed due to the effects of the respective transfer functions on the L-LTF contained in the received signal. Further, the case where the peak value appears at the position different from the head of the L-LTF and the head of the L-LTF is falsely detected is also assumed due to the effects of the respective transfer functions on the L-LTF contained in the received signal. As a result, appropriate processing is not performed in the demodulation unit 140 or the like, which causes an issue such as a decrease in throughput or disconnection.

Given such circumstances, wireless communication apparatus 20 according to embodiments of the present invention have been invented. According to the wireless communication apparatus 20 according to the embodiments of the present invention, it is possible to detect the head of the L-LTF more accurately by improving the calculation accuracy of cross-correlation. The wireless communication apparatus 20 according to a first embodiment and a second embodiment of the present invention are sequentially described hereinafter.

Figure 5:
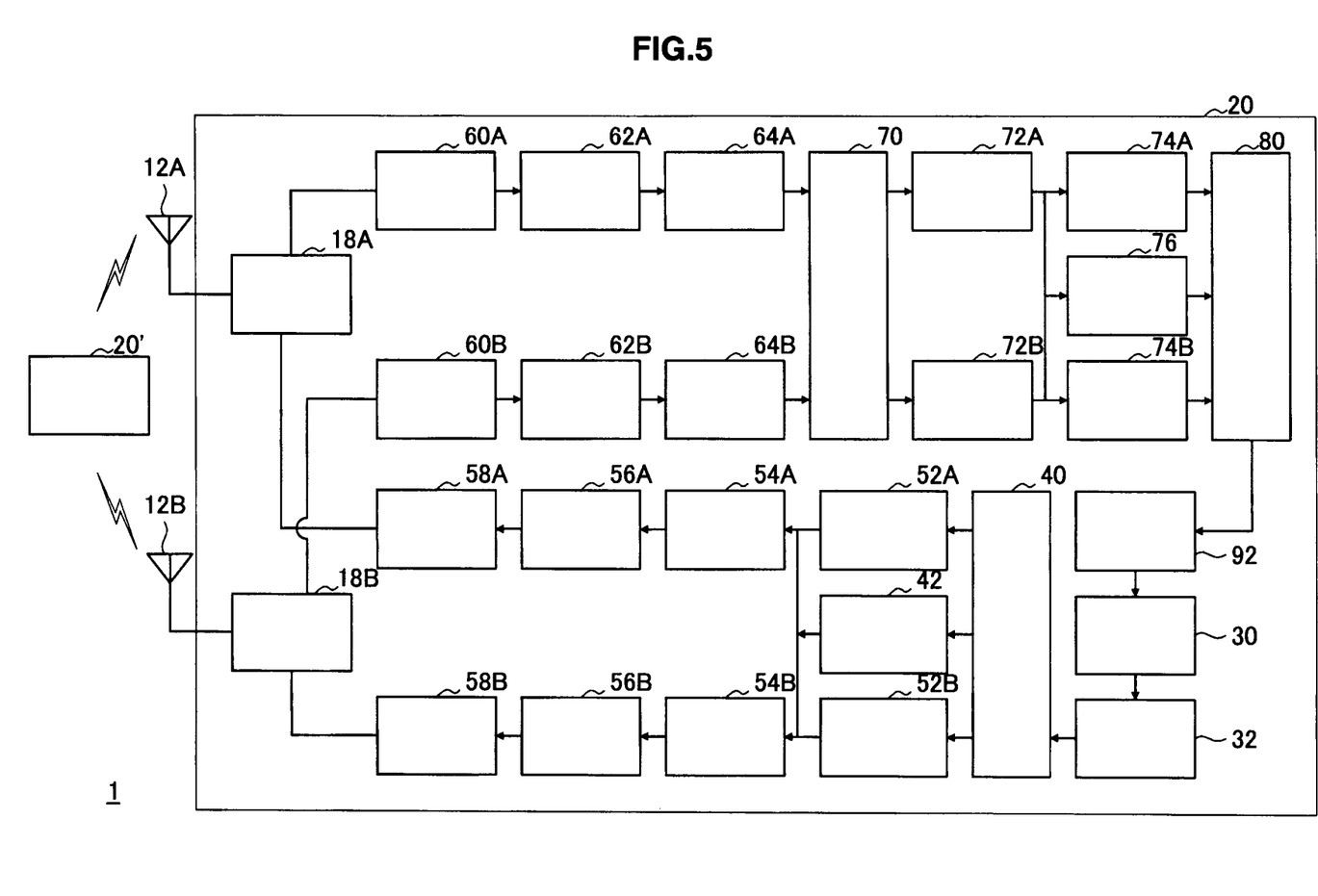
FIG. 5 is an explanatory view showing the structure of a wireless communication system and the structure of a wireless communication apparatus according to a first embodiment of the present invention.

(2) First Embodiment of the Present Invention (2-1) Structure of the Wireless Communication Apparatus According to the First Embodiment of the Present Invention FIG. 5 is an explanatory view showing the structure of a wireless communication system 1 and the structure of a wireless communication apparatus 20 according to the first embodiment of the present invention. Referring to FIG. 5, the wireless communication system 1 includes a plurality of wireless communication apparatus 20 and 20'. Although an example where the wireless communication apparatus 20' serves as the transmitting end and the wireless communication apparatus 20 serves as the receiving end is mainly described below, the wireless communication apparatus 20 and 20' have both the function as the transmitting and the function as the receiving end.

The wireless communication apparatus 20 includes antennas 12A and 12B, selectors 18A and 18B, a MAC processing unit 30, a modulation unit 32, a transmission signal processing unit 40, a signal pattern holding unit 42, IFFT units 52A and 52B, transmission filters 54A and 54B, DACs 56A and 56B, RF transmission processing units 58A and 58B, RF reception processing units 60A and 60B, ADCs 62A and 62B, reception filters 64A and 64B, a synchronous circuit unit 70, FFT units 72A and 72B, channel estimation units 74A and 74B, an RF transfer function estimation unit 76, a signal synthesis unit 80, and a demodulation unit 92.

In this description, each of a plurality of elements having the same function is distinguished by affixing a different alphabetical letter to the same reference numeral. However, when there is no particular need to distinguish between a plurality of elements having the same function, they are denoted by the same reference numeral. For example, when there is no particular need to distinguish between the IFFT units 52A and 52B, they are collectively referred to simply as the IFFT unit 52.

The MAC (Medium Access Control) processing unit 30 performs access control in wireless communication. For example, the MAC processing unit 30 adds control information such as a MAC address of the own apparatus and a MAC address of a destination apparatus to transmission data and outputs it as a bit string.

The modulation unit 32 modulates the bit string that is output from the MAC processing unit 30. For example, the modulation unit 32 may perform modulation by any of the modulation schemes such as BPSK (Binary Phase Shift Keying), QPSK, 16 QAM, 64 QAM, 256 QAM and 8 PSK according to the condition of the wireless transmission line 16. Further, the modulation unit 32 may perform modulation with respect to each bit that is allocated to each subcarrier in order to implement OFDM (Orthogonal Frequency Division Multiplexing).

The transmission signal processing unit 40 performs MIMO transmission processing of the bit string that is output from the modulation unit 32. The MIMO transmission processing is allocation of the bit string to each branch, beam forming or the like, for example.

The IFFT (Inverse Fast Fourier Transform) unit 52 converts a signal in the frequency domain that is obtained by the signal processing in the transmission signal processing unit 40 into a transmission signal in the time domain (OFDM signal) by inverse fast Fourier transform. The transmission filter 54 extracts a prescribed frequency component from the transmission signal in the time domain that is obtained in the IFFT unit 52. A guard interval may be added to the transmission signal in the time domain.

The DAC (Digital-to-Analog Conversion unit) 56 converts the transmission signal having the frequency component extracted by the transmission filter 54 from digital to analog. Then, the RF transmission processing unit 58 converts the analog transmission signal into a high-frequency signal (e.g. 5 GHz band) by IQ modulation, for example.

The selector 18 connects the antenna 12 (receiving unit) to either one of the RF transmission processing unit 58 or the RF reception processing unit 60. If the antenna 12 is connected to the RF transmission processing unit 58 by the selector 18, the high-frequency signal that is obtained in the RF transmission processing unit 58 is transmitted as a radio signal from the antenna 12, and the wireless communication apparatus 20 serves as a transmitting apparatus. On the other hand, if the antenna 12 is connected to the RF reception processing unit 60 by the selector 18, the radio signal that is received by the antenna 12 is supplied as a high-frequency signal to the RF reception processing unit 60, and the wireless communication apparatus 20 serves as a receiving apparatus.

The RF reception processing unit 60 down-converts the high-frequency signal that is input from the antenna 12 and generates an analog baseband received signal (received signal).

The ADC (Analog-to-Digital Conversion unit) 62 converts the analog baseband received signal that is generated by the RF reception processing unit 60 into a digital baseband received signal and outputs it. The reception filter 64 extracts a prescribed frequency component which is contained in the digital baseband received signal that is output from the ADC 62.

The synchronous circuit unit 70 includes an auto-correlation calculation unit 210 for detecting the L-STF and a cross-correlation calculation unit 220 for detecting the L-LTF, which are described above with reference to FIG. 2, and it detects the synchronous timing for cutting out a packet frame subsequent to the preamble. The structure of the synchronous circuit unit 70 is described in detail later with reference to FIG. 6.

The FFT unit 72 cuts out a packet frame based on the synchronous timing that is detected by the synchronous circuit unit 70, performs FFT processing on each cut-out packet frame and generates a received signal in the frequency domain. The channel estimation unit 74 has a function as a transfer function estimation unit that estimates the transfer function of the wireless transmission line 16, which is a transmission line of the radio signal. The transfer function that is estimated by the channel estimation unit 74 may include the transfer function of the wireless communication apparatus 20', which is a transmission source apparatus. Further, the RF transfer function estimation unit 76 estimates the transfer function of the RF reception processing unit 60, which is described in detail later.

The signal synthesis unit 80 performs MIMO reception processing in consideration of the transfer functions estimated by the channel estimation unit 74 and the RF transfer function estimation unit 76. For example, the signal synthesis unit 80 may multiply the signal output from the channel estimation unit 74 by the inverse matrix of the transfer functions (e.g. the channel matrix H) estimated by the channel estimation unit 74 and the RF transfer function estimation unit 76.

The demodulation unit 92 demodulates the signal that is obtained by the signal synthesis unit 80 and outputs a result as a bit string. The MAC processing unit 30 receives the bit string from the demodulation unit 92 and then analyzes the control information contained in the bit string and supplies information different from the control information contained in the bit string to the upper layer.

The basic structure for the wireless communication apparatus 20 to function as a transmitting apparatus and the basic structure for the wireless communication apparatus 20 to function as a receiving apparatus are described in the foregoing. Hereinafter, the signal pattern holding unit 42 and the RF transfer function estimation unit 76 for performing calibration in the wireless communication apparatus 20 are described. The targets of the calibration are as follows, and IQ calibration and antenna calibration are described as examples of the calibration targeting them.

- The structure having frequency characteristics such as the transmission filter 54, an analog filter in the RF transmission processing unit 58 and an analog filter in the RF reception processing unit 60
- The structure related to the aperture effect such as the DAC 56 and the ADC 62
- PA (the structure with nonlinear gain)
- An IQ modulator, an IQ demodulator (the structure to generate IQ imbalance)
- A difference in line length
  - A frequency error component between wireless communication apparatus (IQ Calibration)

There are two kinds of IQ calibration: IQ calibration at the transmitting end and IQ calibration at the receiving end. The IQ calibration at the transmitting end mainly aims at calibration of the DAC 56 and an IQ modulator in the RF transmission processing unit 58. In the IQ calibration at the transmitting end, given calibration data held in the signal pattern holding unit 42 is supplied to the transmission filter 54A, and the IQ modulator in the RF transmission processing unit 58 and the ADC 62 are connected.

As a result, when the calibration data is input to the IQ modulator from the DAC 56, the calibration data is IQ-modulated by the IQ modulator, and further rectified and converted into an absolute value and then input to the ADC 62.

The RF transfer function estimation unit 76 observes the calibration data that is fed back through the ADC 62 and thereby obtains a correction coefficient for correcting an IQ amplitude error and an IQ phase error at the transmitting end.

On the other hand, the IQ calibration at the receiving end mainly aims at calibration of an IQ demodulator in the RF reception processing unit 60 and the ADC 62. In the IQ calibration at the receiving end, and the IQ modulator in the RF transmission processing unit 58 and the IQ demodulator in the RF reception processing unit 60 are connected.

As a result, when the calibration data is input to the IQ modulator from the DAC 56, the calibration data that is IQ-modulated by the IQ modulator is input to the IQ demodulator. The IQ demodulator down-converts the input signal and feeds it back to the RF transfer function estimation unit 76 through the ADC 62.

Because the IQ imbalance at the transmitting end is corrected already, the effect of only the IQ imbalance at the receiving end can be observed from the feedback signal. The RF transfer function estimation unit 76 estimates the IQ amplitude error and the IQ phase error as the transfer function at the receiving end from the feedback signal, thereby acquiring the correction coefficient according to the errors.

(Antenna Calibration)

Antenna calibration aims at eliminating the imbalance of the transfer functions of the analog filter in the RF transmission processing unit 58, the antenna 12 and so on, and it is generally performed after the IQ calibration. In the antenna calibration, as described in detail later, the calibration data that is transmitted from the antenna 12A is received by the antenna 12B and then fed back to the RF transfer function estimation unit 76. After that, the calibration data that is transmitted from the antenna 12B is received by the antenna 12A and then fed back to the RF transfer function estimation unit 76. Then, the RF transfer function estimation unit 76 estimates the transfer functions of the analog filter in the RF transmission processing unit 58, the antenna 12 and so on and calculates the correction coefficient based on the both feedback calibration data.

(Synchronous Circuit Unit 70)

The synchronous circuit unit 70 is described hereinafter in further detail with reference to FIG. 6 and FIG. 7.

Figure 6:
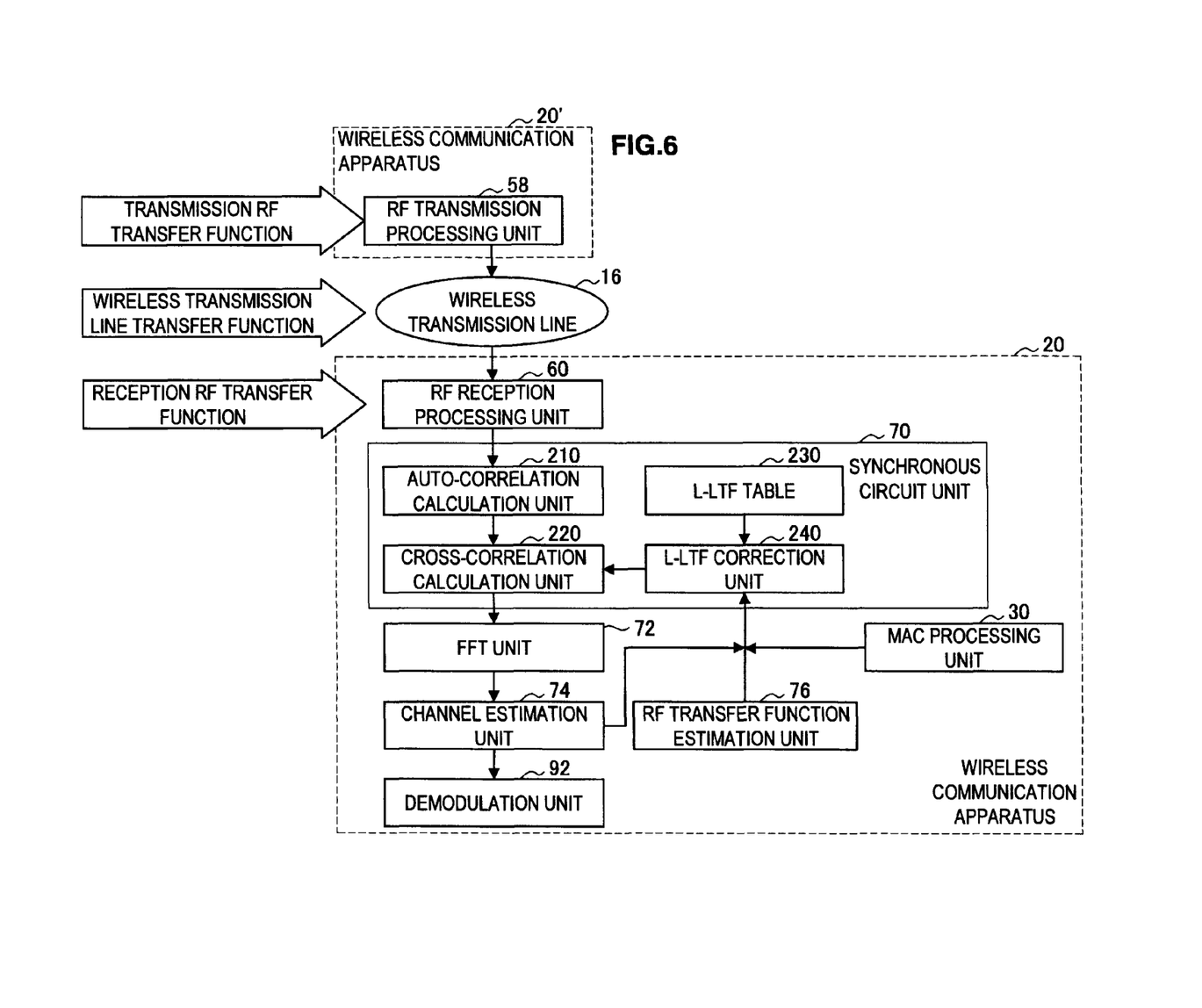
FIG. 6 is a functional block diagram showing the detailed structure of a synchronous circuit unit and the structure of a part of the wireless communication apparatus.

FIG. 6 is a functional block diagram showing the detailed structure of the synchronous circuit unit 70 and the structure of a part of the wireless communication apparatus 20. As shown in FIG. 6, the synchronous circuit unit 70 includes an auto-correlation calculation unit 210, a cross-correlation calculation unit 220, an L-LTF table 230 and an L-LTF correction unit 240.

The auto-correlation calculation unit 210 calculates the auto-correlation between a received signal and a received signal that is delayed by a given time and thereby detects the start of L-STF, the end of L-STF and so on. For example, the auto-correlation calculation unit 210 may delay a received signal by 0.8 μs, which is a repetition period of the signal pattern in the L-STF, and multiply the currently input received signal and the complex conjugate of the delayed received signal. Because the auto-correlation value decreases after the end of the L-STF, the auto-correlation calculation unit 210 can detect the end of L-STF and the start of L-LTF by the decrease in auto-correlation value.

The cross-correlation calculation unit 220 calculates the cross-correlation between the received signal and the L-LTF that is supplied from the L-LTF correction unit 240 and thereby detects the synchronous timing to be used in the subsequent processing.

The L-LTF table 230 functions as a storage unit that stores L-LTF, which is a synchronous signal of a known signal pattern. The L-LTF table 230 may be a storage medium such as a register, nonvolatile memory, a magnetic disk or an optical disc. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk, an MO (Magneto Optical) disk and so on. Examples of the optical disc are CD (Compact Disc), DVD (Digital Versatile Disc), BD (Blu-ray Disc (registered trademark))-R/BD-RE and so on.

The L-LTF correction unit 240 (correction unit) corrects the L-LTF that is stored in the L-LTF table 230 according to a transmission source apparatus and supplies the corrected L-LTF to the cross-correlation calculation unit 220. A method of discriminating a transmission source apparatus and a specific correction method are described hereinafter.

(Method of Discriminating a Transmission Source Apparatus)

If transmission data is larger than one packet, a transmission source apparatus transmits a plurality of packets in a burst manner at an interval of SIFS (16 μs) or RIFS (2 μs) (which is called bursting mode). During the bursting mode, the transmission source apparatus indicates that in a field called ACK policy which is contained in the MAC header of the packet. Further, the address of the transmission source apparatus is indicated in the MAC header.

Therefore, the MAC processing unit 30 of the wireless communication apparatus 20 can determine the transmission source apparatus of a packet to be received next by referring to the ACK policy contained in the MAC header.

The ACK policy is the field that indicates whether to request transmission of an ACK packet. For example, transmission of an ACK packet is requested only for the last packet transmitted in a burst manner. Thus, if transmission of an ACK packet is not requested in the ACK policy for a certain packet (a first radio signal), the MAC processing unit 30 of the wireless communication apparatus 20 determines that the transmission source apparatus of a packet to be received next (a second radio signal) is the same as the transmission source apparatus of the currently received packet.

(Method of Correcting L-LTF)

The transfer function of the RF transmission processing unit 58 of the transmission source apparatus and the transfer function of the wireless transmission line 16 (which are referred to hereinafter as a channel transfer function) do not significantly vary in the same transmission source apparatus and the same wireless transmission line 16. Thus, the L-LTF correction unit 240 stores the channel transfer function of a transmission source apparatus in association with the transmission source apparatus of a packet that is received once.

Then, the L-LTF correction unit 240 searches for the channel transfer function corresponding to the transmission source apparatus of the packet to be received next that is determined by the MAC processing unit 30. If the L-LTF correction unit 240 stores the channel transfer function corresponding to the transmission source apparatus of the packet to be received next, the L-LTF correction unit 240 multiplies the L-LTF of the L-LTF table 230 by the channel transfer function and the transfer function estimated by the RF transfer function estimation unit 76. After that, the L-LTF correction unit 240 supplies the L-LTF that is corrected by the multiplication to the cross-correlation calculation unit 220.

Figure 7:
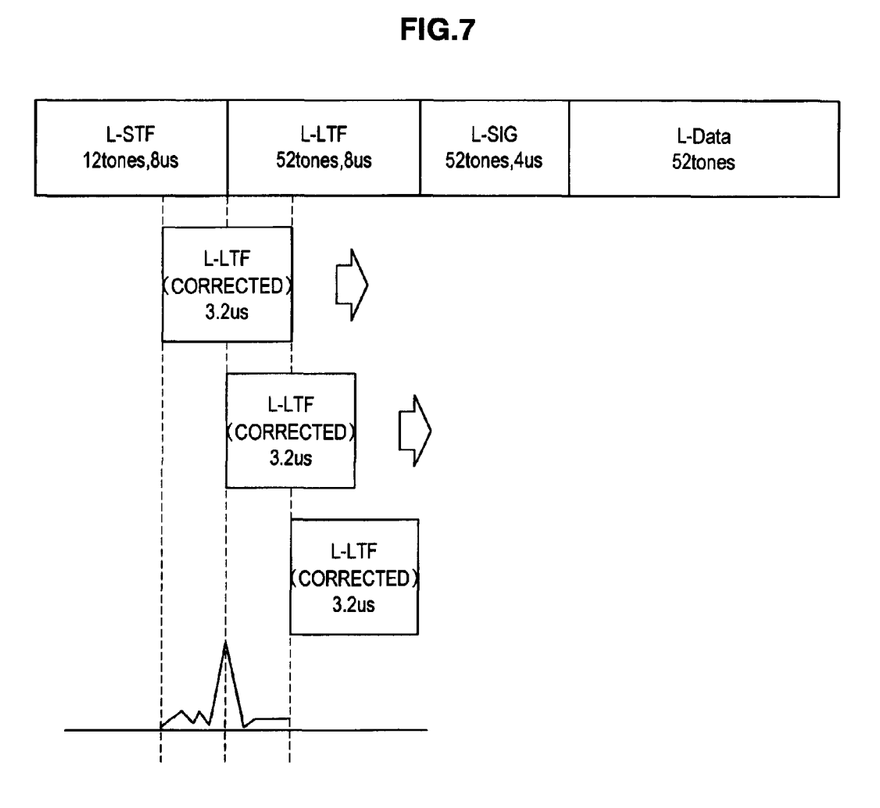
FIG. 7 is an explanatory view schematically showing the way of cross-correlation calculation according to the first embodiment of the present invention.

FIG. 7 is an explanatory view schematically showing the way of cross-correlation calculation according to the embodiment. As shown in FIG. 7, the cross-correlation calculation unit 220 calculates the cross-correlation using the L-LTF that is corrected in consideration of the channel transfer function and the reception RF transfer function. It is thereby possible in this embodiment to improve the detection accuracy of the synchronous timing in the cross-correlation calculation unit 220 even if the channel transfer function or the reception RF transfer function is mixed into the received packet. As a result, more accurate demodulation processing in the demodulation unit 92 is expected, thereby preventing a decrease in throughput or disconnection.

As described in the above "Method of discriminating a transmission source apparatus", it is difficult for the MAC processing unit 30 to determine the transmission source apparatus of a packet that is received first in the bursting mode at the time of the cross-correlation calculation of the packet. Therefore, for the packet that is received first in the bursting mode, the L-LTF correction unit 240 may correct the L-LTF using the reception RF transfer function that does not depend on the transmission source apparatus and supply the corrected L-LTF to the cross-correlation calculation unit 220.

Further, although the example where the L-LTF correction unit 240 stores the channel transfer function for each transmission source apparatus is described in the foregoing, the present invention is not limited thereto. For example, the L-LTF correction unit 240 may store the L-LTF that is corrected by multiplication of the channel transfer function for each transmission source apparatus. This structure eliminates the need to perform correction processing of the L-LTF at the time of reception, thereby enabling more rapid supply of the corrected L-LTF to the cross-correlation calculation unit 220.

Furthermore, there is a case where an estimated value of the channel transfer function is not obtained accurately due to a difference in initial phase between the wireless communication apparatus 20 and the transmission source apparatus. In light of this, the wireless communication apparatus 20 may calculate an auto-correlation value for each of the cases where the initial phase is 0 degree, 45 degrees, 90 degrees, 135 degrees, 180 degrees, 225 degrees, 270 degrees and 315 degrees, and select a combination with which a peak appears most sharply as the synchronous timing.

(2-2) Operation of the Wireless Communication Apparatus According to the First Embodiment of the Present Invention The functions of the wireless communication apparatus according to the first embodiment of the present invention are described above with reference to FIGS. 5 to 7. Hereinafter, the operation of the wireless communication apparatus according to the first embodiment of the present invention is described with reference to FIG. 8.

Figure 8:
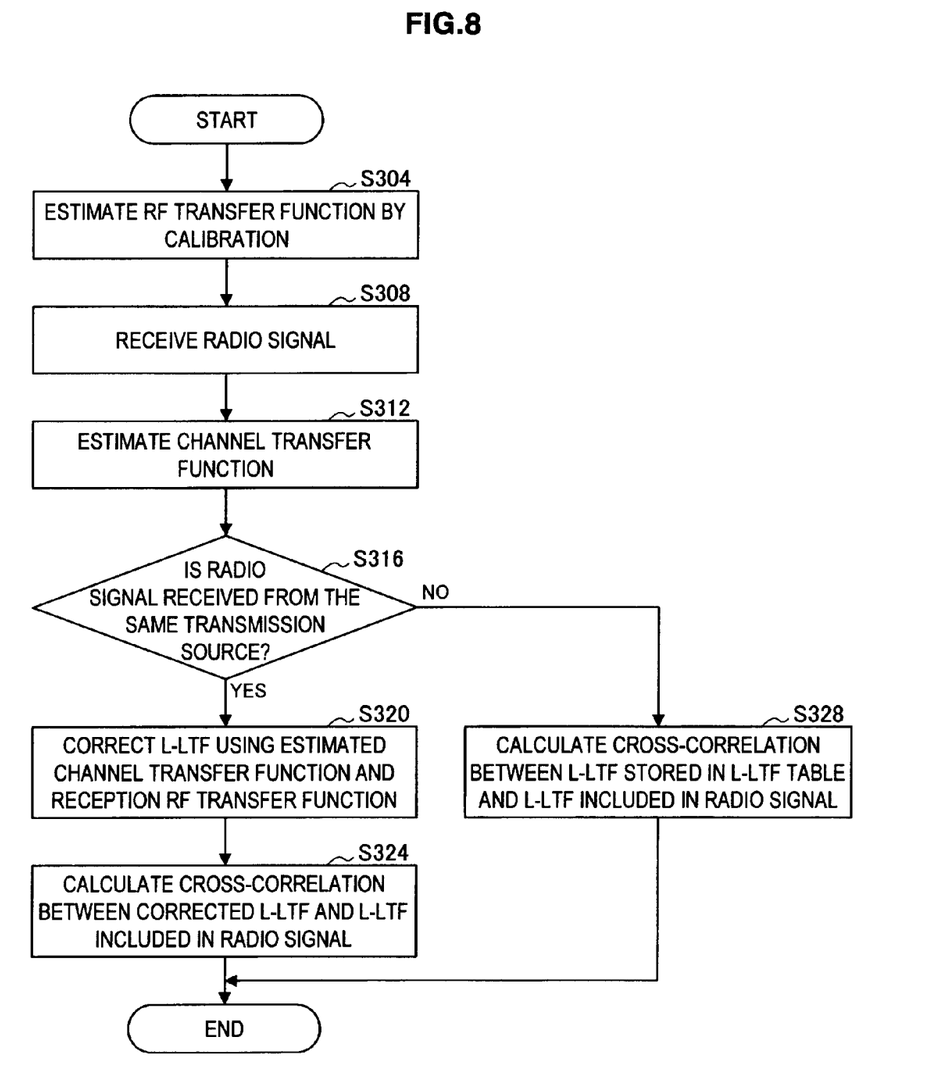
FIG. 8 is a flowchart showing the flow of the operation of the wireless communication apparatus according to the first embodiment of the present invention.

FIG. 8 is a flowchart showing the flow of the operation of the wireless communication apparatus according to the first embodiment of the present invention. As shown in FIG. 8, the RF transfer function estimation unit 76 of the wireless communication apparatus 20 first estimates the RF transfer function of the RF reception processing unit 60, the ADC 62 or the like by calibration (S304). Next, when the wireless communication apparatus 20 receives a radio signal (S308), the channel estimation unit 74 estimates the channel transfer function including the transfer function of the RF transmission processing unit 58 of the transmission source apparatus and the transfer function of the wireless transmission line 16 (S312). The L-LTF correction unit 240 stores the channel transfer function estimated by the channel estimation unit 74 in association with the transmission source apparatus.

After that, when receiving a radio signal from the transmission source apparatus for which the channel transfer function is stored (S316), the L-LTF correction unit 240 corrects the L-LTF of the L-LTF table 230 using the relevant channel transfer function and the reception RF transfer function (S320). Then, the cross-correlation calculation unit 220 calculates the cross-correlation between the L-LTF corrected by the L-LTF correction unit 240 and the L-LTF contained in the radio signal to thereby detect the synchronous timing (S324).

On the other hand, when receiving a radio signal from the transmission source apparatus for which the channel transfer function is not stored (S316), the L-LTF correction unit 240 supplies the L-LTF stored in the L-LTF table 230 to the cross-correlation calculation unit 220 (S328). Then, the cross-correlation calculation unit 220 calculates the cross-correlation between the L-LTF stored in the L-LTF table 230 and the L-LTF contained in the radio signal to thereby detect the synchronous timing. Alternatively, when receiving a radio signal from the transmission source apparatus for which the channel transfer function is not stored (S316), the L-LTF correction unit 240 may correct the L-LTF of the L-LTF table 230 using the reception RF transfer function and supply the corrected L-LTF to the cross-correlation calculation unit 220.

(3) Second Embodiment of the Present Invention

Figure 9:
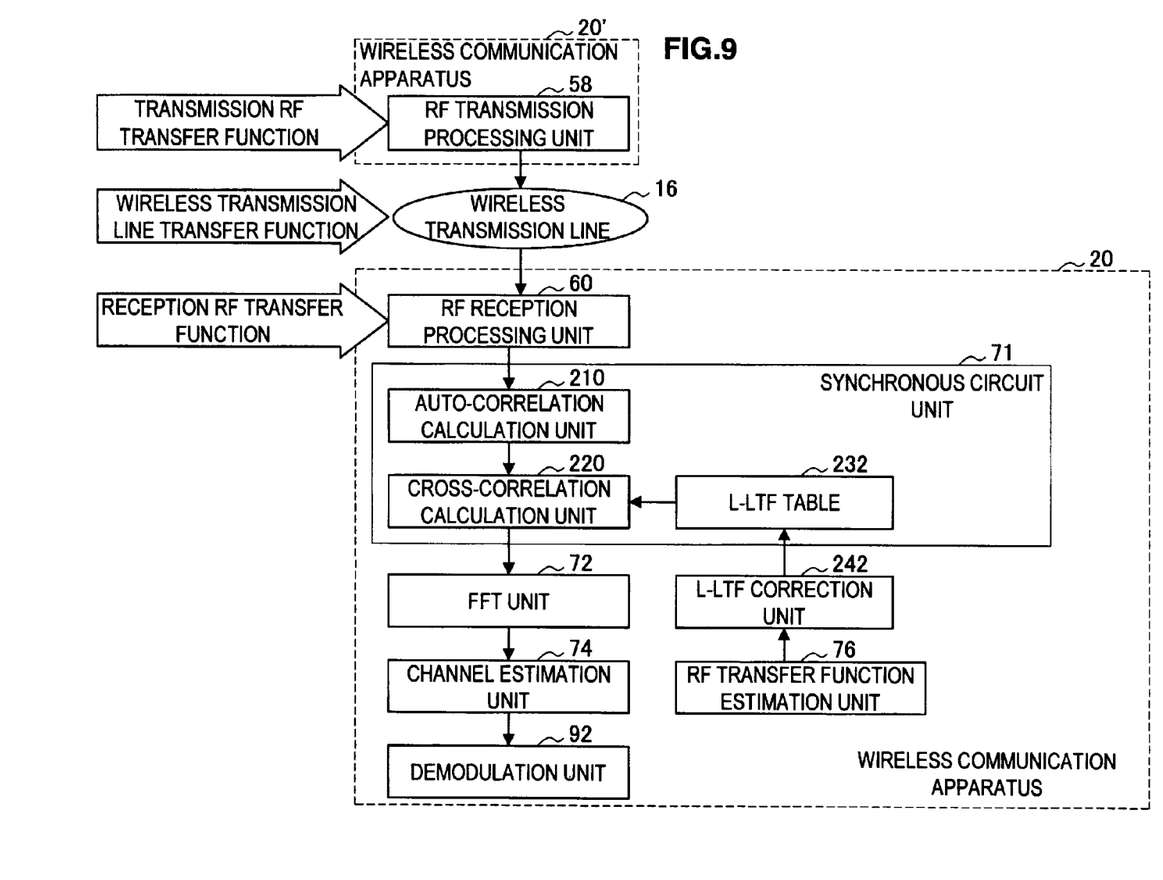
FIG. 9 is a functional block diagram showing the structure of a synchronous circuit unit and a part of the other structure of the wireless communication apparatus.

The second embodiment of the present invention is described hereinafter with reference to FIG. 9. FIG. 9 is a functional block diagram showing the structure of a synchronous circuit unit 71 and a part of the other structure of the wireless communication apparatus 20 according to the second embodiment of the present invention. The wireless communication apparatus 20 according to the second embodiment of the present invention includes substantially the same functions as the first embodiment, and the functions different from the first embodiment are mainly described hereinbelow.

As shown in FIG. 9, the synchronous circuit unit 71 according to the embodiment includes an auto-correlation calculation unit 210, a cross-correlation calculation unit 220 and an L-LTF table 232.

The auto-correlation calculation unit 210 calculates the auto-correlation between a received signal and a received signal delayed by a given time and thereby detects the start of L-STF, the end of L-STF and so on. The cross-correlation calculation unit 220 calculates the cross-correlation between the received signal and the L-LTF supplied from the L-LTF table 232 and thereby detects the synchronous timing to be used in the subsequent processing.

Although the example where the transfer function of the RF transmission processing unit 58 of the transmission source apparatus, the transfer function of the wireless transmission line 16 and the transfer function of the RF reception processing unit 60 or the like are used as the transfer function of a communication path of a radio signal is described in the first embodiment, the transfer function of the RF reception processing unit 60 is used in this embodiment.

Specifically, the L-LTF table 232 stores the L-LTF that is corrected using the reception RF transfer function including the transfer function of the RF reception processing unit 60. The correction is performed by an L-LTF correction unit 242 based on the reception RF transfer function that is estimated by the RF transfer function estimation unit 76.

In this structure, although the calculation accuracy of the cross-correlation is lower than that of the first embodiment, it is possible to improve the synchronous characteristics compared to the wireless communication apparatus 100 related to the embodiment which performs cross-correlation calculation using the L-LTF that is not corrected at all.

(4) Summary

As described in the foregoing, according to the first embodiment of the present invention, the cross-correlation calculation unit 220 calculates the cross-correlation using the L-LTF that is corrected in consideration of the channel transfer function and the reception RF transfer function. Therefore, according to the first embodiment of the present invention, it is possible to improve the detection accuracy of the synchronous timing in the cross-correlation calculation unit 220 even if the channel transfer function or the reception RF transfer function is mixed into the received radio signal. As a result, more accurate demodulation processing in the demodulation unit 92 can be expected, thereby preventing a decrease in throughput or disconnection.

Further, as described in the second embodiment, the L-LTF may be corrected in consideration of a part of the transfer function that is mixed into the received radio signal. According to the second embodiment of the present invention, it is possible to improve the synchronous characteristics compared to the wireless communication apparatus 100 related to the embodiment which performs cross-correlation calculation using the L-LTF that is not corrected at all, although the calculation accuracy of the cross-correlation is lower than that of the first embodiment.

It should be understood by those skilled in the art that various modifications, combinations, sub-combinations and alterations may occur depending on design requirements and other factors insofar as they are within the scope of the appended claims or the equivalents thereof.

For example, although the channel estimation unit 74 and the RF transfer function estimation unit 76 are described as being separate structures in the above embodiments, a structure capable of estimating both the channel transfer function and the reception RF transfer function may be placed in the wireless communication apparatus 20.

Further, although the case where the received signal is input to the synchronous circuit unit 70 in the state where the reception RF transfer function is not corrected is described in the first embodiment, the present invention is not limited thereto. For example, the wireless communication apparatus 20 may input the received signal to the synchronous circuit unit 70 in the state where the reception RF transfer function is corrected. In this case, the L-LTF correction unit 240 may correct the L-LTF of the L-LTF table 230 using the channel transfer function and not using the reception RF transfer function and supplies the corrected L-LTF to the cross-correlation calculation unit 220.

Furthermore, it is not necessary to perform each step in the processing of the wireless communication apparatus 20 in chronological order according to the sequence shown in the flowchart. For example, each step in the processing of the wireless communication apparatus 20 may include the processing which is performed in parallel or individually (e.g. parallel processing or object processing).

The present application contains subject matter related to that disclosed in Japanese Priority Patent Application JP 2008-171142 filed in the Japan Patent Office on Jun. 30, 2008, the entire content of which is hereby incorporated by reference.

What is claimed is:

1. A receiving apparatus comprising:
a receiving unit to receive a radio signal;
a processing unit to determine a transmission source of the radio signal;
a storage unit to store transfer function information in association with at least one transmission source;
a correction unit to determine whether transfer function information corresponding to the transmission source of the radio signal is stored in the storage unit;
a transfer function estimation unit to estimate transfer functions of radio signal communication paths; and
a cross-correlation calculation unit to calculate cross-correlation between a synchronous signal contained in the radio signal received by the receiving unit and a known synchronous signal multiplied by a transfer function either estimated by the transfer function estimation unit or stored as transfer function information in the storage unit.

2. The receiving apparatus according to claim 1, wherein:
the storage unit stores the known synchronous signal; and
the correction unit multiplies the known synchronous signal stored in the storage unit by a transfer function estimated by the transfer function estimation unit or stored as transfer function information in the storage unit.

3. The receiving apparatus according to claim 2, wherein:
the storage unit stores the transfer functions estimated by the transfer function estimation unit in association with transmission sources of radio signals; and
the correction unit extracts a transfer function associated with a transmission source apparatus of a radio signal received by the receiving unit from the storage unit and multiplies the known synchronous signal by the transfer function associated with the transmission source apparatus.

4. The receiving apparatus according to claim 2, wherein the correction unit:
searches for a channel transfer function corresponding to a transmission source apparatus of the packet to be received next;
multiplies the known synchronous signal stored in the storage unit corresponding to the transmission source apparatus by the channel transfer function and by the transfer function estimated by the transfer function estimation unit to provide a corrected known synchronous signal; and
supplies the corrected known synchronous signal to the cross-correlation calculation unit.

5. The receiving apparatus according to claim 1, wherein:
the correction unit multiplies the known synchronous signal by a transfer function estimated by the transfer function estimation unit; and
the storage unit stores the known synchronous signal multiplied by the transfer function estimated by the transfer function estimation unit.

6. The receiving apparatus according to claim 1, wherein:
the transfer function estimation unit estimates a transfer function based on a first radio signal containing information indicating that a radio signal is continuously transmitted subsequently, and
the cross-correlation calculation unit calculates cross-correlation between a synchronous signal contained in a second radio signal transmitted continuously subsequent to the first radio signal and by the known synchronous signal multiplied by the transfer function estimated based on the first radio signal.

7. The receiving apparatus according to one of claims 1 to 6, wherein a transfer function of the communication path includes at least any one of a transfer function of a wireless transmission line of the radio signal, a transfer function of the receiving unit and a transfer function of a transmission source apparatus of the radio signal.

8. The receiving apparatus according to claim 1, wherein the synchronous signal comprises the preamble of a wireless transmission packet.

9. The receiving apparatus according to claim 8, wherein the preamble comprises a L-STF (Short Training Field) and L-LTF (Long Training Field).

10. The receiving apparatus according to claim 1, wherein:
the synchronous signal comprises a L-LTF (Long Training Field) of a transmission packet of a radio signal transmitted by a transmitting apparatus; and
the known synchronous signal comprises a L-LTF (Long Training Field) of a transmission packet of a radio signal transmitted by the transmitting apparatus.

11. A receiving method comprising the steps of:
receiving a radio signal;
determining a transmission source of the radio signal;
determining whether transfer function information corresponding to the transmission source of the radio signal is stored in a storage unit;
estimating a transfer function of a communication path of the first radio signal if transfer function information corresponding to the transmission source of the radio signal is not stored in the storage unit; and
calculating cross-correlation between a synchronous signal contained in the received radio signal and a known synchronous signal multiplied by either the estimated transfer function or a transfer function included in the transfer function information in the storage unit.

12. A wireless communication system comprising:
a transmitting apparatus to transmit a radio signal; and
a receiving apparatus including:
a receiving unit to receive the radio signal transmitted from the transmitting apparatus;
a storage unit to store transfer function information in association with at least one transmission source;
a correction unit to determine whether transfer function information corresponding to the transmission source of the radio signal is stored in the storage unit;
a transfer function estimation unit to estimate transfer functions radio signal communication paths; and
a cross-correlation calculation unit to calculate cross-correlation between a synchronous signal contained in the radio signal received by the receiving unit and a known synchronous signal multiplied by a transfer function either estimated by the transfer function estimation unit or stored as transfer function information in the storage unit.

* * * * *